(12) United States Patent
Chen et al.

(10) Patent No.: US 11,108,330 B2
(45) Date of Patent: Aug. 31, 2021

(54) CIRCUITS AND METHODS USING POWER SUPPLY OUTPUT VOLTAGE TO POWER A PRIMARY SIDE AUXILIARY CIRCUIT

(71) Applicant: Queen's University at Kingston, Kingston (CA)

(72) Inventors: Yang Chen, Hefei (CN); Yan-Fei Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

(21) Appl. No.: 16/998,485

(22) Filed: Aug. 20, 2020

(65) Prior Publication Data

US 2021/0057998 A1 Feb. 25, 2021

Related U.S. Application Data

(60) Provisional application No. 62/890,568, filed on Aug. 22, 2019.

(51) Int. Cl.
*H02M 3/335* (2006.01)
*H02M 1/00* (2006.01)
*H02M 3/337* (2006.01)

(52) U.S. Cl.
CPC ......... *H02M 3/33569* (2013.01); *H02M 1/00* (2013.01); *H02M 3/337* (2013.01); *H02M 1/0006* (2021.05); *H02M 1/0045* (2021.05); *H02M 1/0067* (2021.05)

(58) Field of Classification Search
CPC .... H02M 3/33569; H02M 3/337; H02M 1/00; H02M 1/0006; H02M 1/0045; H02M 1/0067
See application file for complete search history.

(56) References Cited

U.S. PATENT DOCUMENTS

| | | | |
|---|---|---|---|
| 10,651,754 B1* | 5/2020 | Murugesan | H02M 3/33592 |
| 2014/0204624 A1* | 7/2014 | Djenguerian | H02M 3/33592 363/21.12 |
| 2019/0068070 A1* | 2/2019 | Iyasu | H02M 3/33576 |
| 2019/0229627 A1* | 7/2019 | Hande | H02M 1/08 |

* cited by examiner

*Primary Examiner* — Jue Zhang
(74) *Attorney, Agent, or Firm* — Stephen J. Scribner

(57) ABSTRACT

In an AC-DC converter having a primary side control circuit, auxiliary power for the control circuit is derived from the converter secondary side through an isolated DC-DC converter. The circuits and methods solve the problem of supplying primary side auxiliary power during light load or no load operation of the AC-DC power converter. Since the output voltage of the AC-DC converter is normally regulated at a fixed level, the auxiliary voltage that is generated by the isolated DC converter is regulated. In some cases the isolated DC-DC converter may not need to be regulated, which simplifies the design and reduces overall cost.

22 Claims, 5 Drawing Sheets

CIRCUITS AND METHODS USING POWER SUPPLY OUTPUT VOLTAGE TO POWER A PRIMARY SIDE AUXILIARY CIRCUIT

RELATED APPLICATION

This application claims the benefit of the filing date of Application No. 62/890,568, filed on 22 Aug. 2019, the contents of which are incorporated herein by reference in their entirety.

FIELD

This invention relates to AC-DC power supplies. More specifically, this invention provides methods and circuits for powering primary side auxiliary circuits, such as controllers of AC-DC power supplies, using the power supply output voltage.

BACKGROUND

Many AC-DC applications require the output (DC) side to be isolated from the input (AC) side, such as the utility grid. For cell phone and laptop power adapters, this isolation is a key requirement because the output has direct contact with users. In such power supplies, a transformer is used for the isolation. The components located between the input AC voltage and the isolation transformer primary winding are considered as primary side components. The components located between the transformer secondary winding and the output voltage are considered as secondary side components.

In a typical power adapter application, as shown in FIG. 1, the main controller integrated circuit (IC) is placed at the primary side. This way the controller and the primary side components, especially the power switches, can share a common ground. Another benefit of this scheme is that during startup, the controller and other peripherals can draw power from the AC input directly (via a diode bridge) with no need for isolation. During normal operation, an auxiliary transformer winding (shown as Na in FIG. 1) along with a regulator is usually used to provide power for the controller and other peripherals. Vcc_p shown in FIG. 1 is the auxiliary power rail, also referred to as auxiliary power as compared to the main power transferred to the output.

During normal operation, the primary side power switch operates in switching mode and the auxiliary winding receives power from the main transformer (or isolation transformer) and the auxiliary voltage Vcc_p is maintained. Under light load or no load operation, in order to reduce the power consumption at this operating mode, "Burst Mode" operation may be used. In burst mode operation, the primary power switch is turned on for one or a few switching cycles and the output voltage rises to an upper threshold. Then the primary side switch is turned off, causing the output voltage to decrease. Since there is no load current, or very small load current, the output capacitor of the power supply discharges very slowly and therefore, the output voltage falls very slowly. When the output voltage falls to a pre-determined lower threshold, the primary side switch is turned on again for one or a few cycles and the output voltage rises very quickly to the upper threshold. This process repeats.

Since there is no load current or very small load current, the primary switch operates at switching mode for one or a few switching cycles. The primary side operates at off mode (no switching) for a much longer time period, such as hundreds or thousands switching cycles. A common operating condition is that the primary switch is turned on for a small number of switching cycles (such as three switching cycles) and the primary switch is turned for 100 to 1,000 switching cycles. If the switching frequency is 250 KHz, one switching cycle is 4 μs. When the primary switch is turned off for 1,000 switching cycles, the off time period is 4 ms.

When the power switch is turned off, no energy is supplied from input side to the auxiliary output, Vcc_p. The voltage Vcc_p will decrease because the control circuit still operates during the burst mode operation and draws current from Caux. When the voltage Vcc_p decreases to a given level, the control circuit will not operate properly and then the power supply may malfunction. In other words, if the burst mode off time is long enough, the control circuit at the primary side will lose power and stop working. Another problem with such primary side Vcc_p configuration is that the voltage level from the transformer auxiliary winding is normally changing, dependent on the input voltage and/or output voltage. Therefore, a voltage regulator is needed to keep Vcc_p constant, as shown in FIG. 1.

Two methods may be used to solve this problem. The first method is to use a larger capacitor, Caux, as shown in FIG. 1. This method increases the size (or volume) of the power converter due to the large capacitor needed. The second method is to add a dead load at the output side to draw some current when there is actually no load current. This method introduces extra power loss in the light load or no load condition. Neither method is desirable.

SUMMARY

Described herein are methods and circuits that provide a stable primary side auxiliary voltage rail that is powered from the output side of a power supply. The primary side auxiliary voltage rail Vcc_p is available under all operation conditions, including Burst Mode control with long off time, without the need for a large hold up capacitor.

With prior methods, the primary side voltage rail Vcc_p comes from an auxiliary winding of the main power transformer. Such an approach suffers from the following problems: (1) Vcc_p may be lost during light load or no load operation when Burst Mode control is used for the primary side switch; (2) it requires a large capacitor to store the energy required by the primary side control circuit when the primary switch is off; (3) it requires an additional winding at the main power transformer of the switching power supply; (4) it requires a voltage regulation circuit to maintain Vcc_p constant.

Embodiments described herein solve all the above problems by generating primary side auxiliary voltage Vcc_p from the output side (secondary side) of the power supply using an isolated DC power circuit, such as a non-controlled DC-DC converter. The input terminal of the isolated non-controlled DC-DC converter is connected to the output voltage, or a voltage derived from the output voltage, of the power supply. It is not derived from a transformer auxiliary winding. The output terminal of the isolated non-controlled DC-DC converter is at the primary side and provides a stable voltage to power the primary side control circuit. Embodiments are especially suitable for light load or no load operation, and they improve the efficiency of the light load operation. In light load/no load operation, Burst Mode control is normally used. Embodiments also require only a small, low value capacitor since no energy hold up is required. As a further advantage of the embodiments, the implementation cost is low.

One aspect of the invention relates to an AC-DC converter, comprising: a primary side including an AC input and a primary side circuit having at least one switch; an isolating transformer; a secondary side including a secondary side circuit and a DC output; a control circuit that provides control signals to the at least one switch of the primary side circuit; and a DC power circuit having a secondary side that receives DC output power from the secondary side of the AC-DC converter, and a primary side that outputs DC power to the control circuit; wherein the DC power circuit secondary side and primary side are isolated.

Another aspect of the invention relates to a method for providing auxiliary power for a primary side control circuit of an AC-DC converter, comprising: providing an AC-DC converter primary side including an AC input and a primary side control circuit having at least one switch, and an AC-DC converter secondary side including a secondary side circuit and a DC output; implementing a DC power circuit having a secondary side that receives DC output power from the secondary side of the AC-DC converter, and a primary side that outputs DC auxiliary power to the primary side control circuit; wherein the DC power circuit secondary side and primary side are isolated.

In various embodiments, the DC power circuit comprises an isolated DC-DC converter.

In one embodiment, the isolated DC-DC converter comprises a voltage regulator that regulates an output voltage $V_{cc\_p}$ of the isolated DC-DC converter.

Embodiments may include a circuit that regulates an input voltage $V_{cc\_s}$ of the isolated DC-DC converter.

In one embodiment, the circuit that regulates an input voltage $V_{cc\_s}$ of the isolated DC-DC converter is a Buck converter or a low-dropout (LDO) voltage regulator.

In one embodiment, the isolated DC-DC converter comprises a pulse transformer that isolates a secondary side of the DC-DC converter from a primary side of the DC-DC converter.

In one embodiment, the isolated DC-DC converter comprises a secondary side half-bridge power amplifier that outputs pulses to the pulse transformer.

In one embodiment, the isolated DC-DC converter comprises an oscillator that provides driving signals to switches of the half-bridge power amplifier.

In one embodiment, the isolated DC-DC converter comprises a push-pull amplifier that outputs pulses to the pulse transformer.

In one embodiment, the isolated DC-DC converter comprises an oscillator that provides driving signals to switches of the push-pull amplifier.

In one embodiment, the isolated DC-DC converter primary side outputs first and second DC power to the control circuit.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Described herein are circuits and methods that solve the above-mentioned problem of supplying primary side auxiliary power $V_{cc\_p}$ during light load or no load operation of the power supply. According to embodiments, the primary side auxiliary power $V_{cc\_p}$ is derived from the secondary side output voltage of the power supply through an isolated DC-DC converter, as shown in the generalized schematic diagram of FIG. 2. For example, as shown in FIG. 2, the auxiliary power is obtained from the output voltage rail Vo, instead of a transformer winding as in prior approaches (e.g., FIG. 1).

Figure 2:
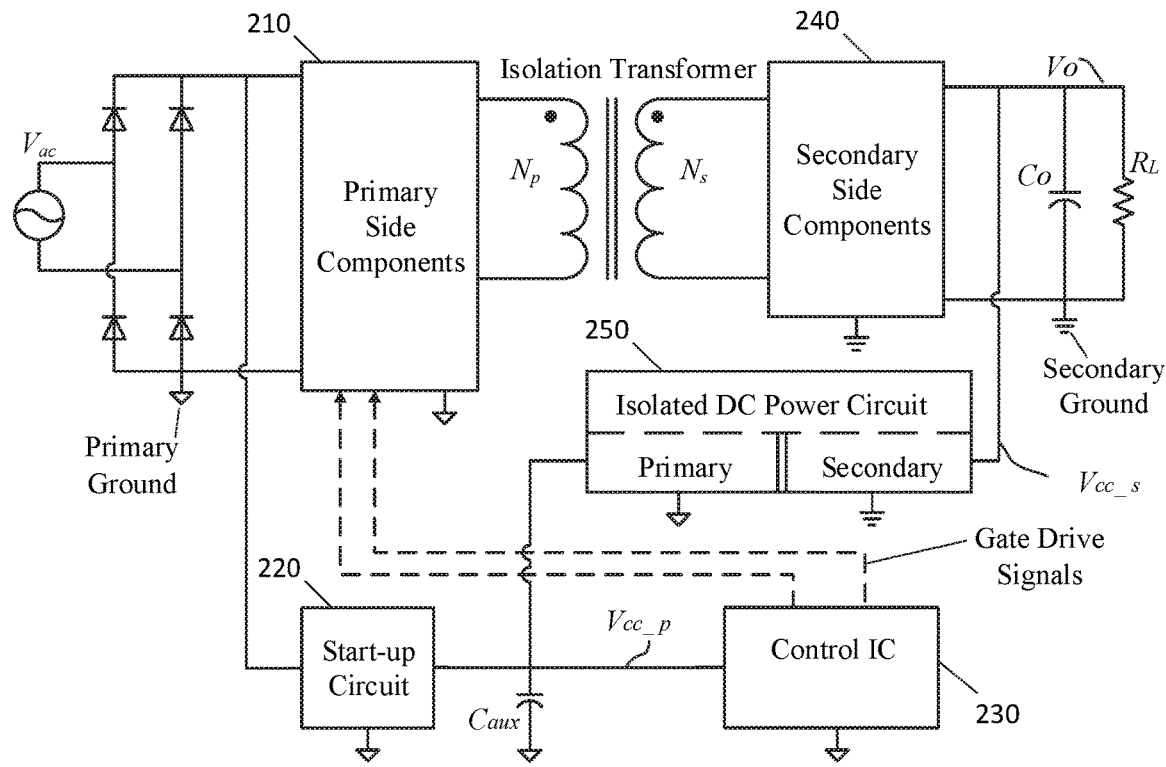
FIG. 2 is a circuit diagram of a power supply with an auxiliary power derived from the secondary side, according to one embodiment.

Referring to FIG. 2, the generalized embodiment includes primary side components 210, a start-up circuit 220, a control IC (sometimes referred to as an "auxiliary circuit") 230, secondary side components 240, and a DC power circuit 250 that obtains an input power from the DC output of the AC-DC converter and outputs isolated DC power to the control circuit 230. The primary side components 210 and secondary side components 240 may include switches, etc., depending on the design of the AC-DC converter. However, the specific design of the AC-DC converter is not critical to the invention, as embodiments may be implemented with AC-DC converters typically with a diode bridge followed by a filter capacitor, with or without power factor correction. The start-up circuit 220 operates in the usual way, that is, it is used to supply power to the control IC 230 only during initial power-up of the AC-DC converter (i.e., when the input voltage is applied to the power supply initially). Once the output voltage is established and output power is available from the AC-DC converter the start-up circuit 220 is turned off and the isolated DC power circuit provides power to the primary side control IC. Since the start-up circuit operation is the same as in prior power supplies, no further details of the start-up circuit are presented herein.

Figure 1:
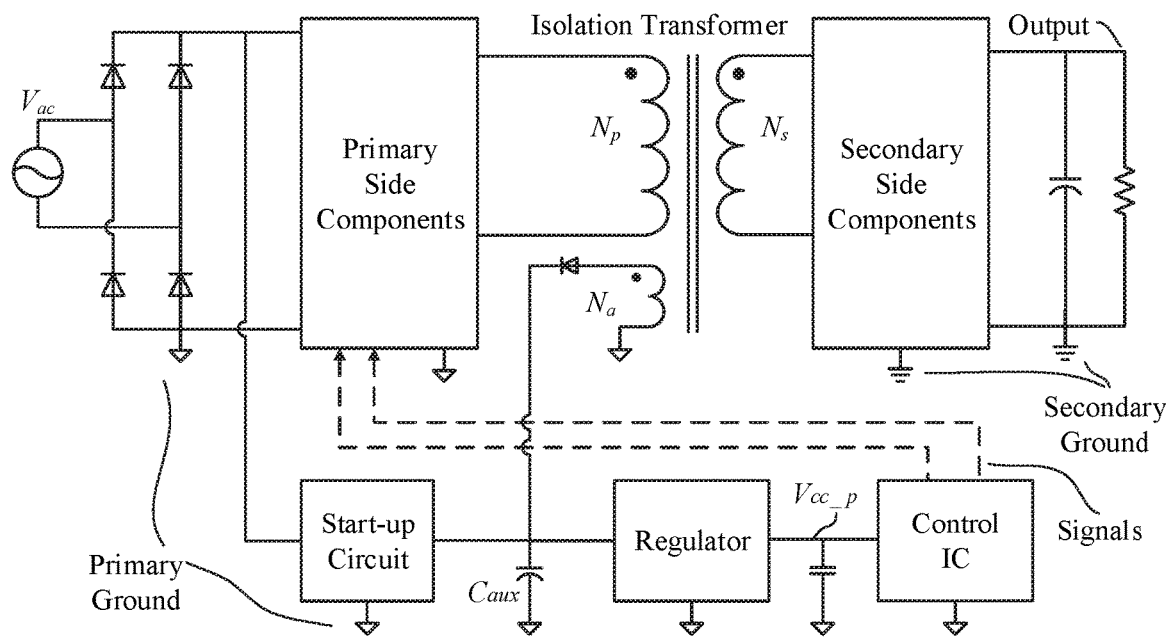
FIG. 1 is a circuit diagram of a power supply primary side startup circuit and auxiliary power, according to the prior art.

Since the output voltage Vo of the AC-DC power supply is normally regulated at a fixed level, the $V_{cc\_p}$ that is generated by the isolated DC power circuit 250 is always roughly regulated, such as within tolerance of +/−5%. As a result, the isolated DC power circuit 250 may not need to be regulated, which simplifies the design and reduces cost. According to embodiments described herein, since the auxiliary power $V_{cc\_p}$ is derived from the DC output voltage Vo of the AC-DC converter, the problem of falling output voltage when the primary side is off, as in prior approaches such as FIG. 1, is solved. Also, since the DC power circuit transfers power from the AC-DC converter output side to the primary side, isolation is required. In some embodiments, the isolated DC power circuit may be implemented with an isolated DC-DC converter. Various implementations of an isolated DC-DC converter are shown in the embodiments described below.

In addition, during burst mode operation of the AC-DC converter, the output voltage remains regulated (i.e., it is substantially constant). Therefore, regulation of the auxiliary power is maintained during no load/very light load conditions. In the prior method with an auxiliary transformer winding of FIG. 1, the converter must continuously operate in order to supply the auxiliary power. This causes the light load efficiency to decrease. In other prior designs, at no load or light load, converters are shut down intermittently as long as the output voltage can be maintained, i.e., using burst mode operation. Embodiments described herein overcome those deficiencies of prior designs and improve the light load efficiency, allowing power supplies to meet new and more stringent industry standards and regulations for efficiency.

FIGS. 3A, 3B, and 4-9 show embodiments of isolated DC-DC converter implementations of the DC power circuit 250 of FIG. 2. In these embodiments, the input to isolated DC-DC converter is the output voltage Vo of the AC-DC power supply. In the embodiments, a low power Buck converter, or a low-dropout (LDO) voltage regulator may optionally be used to generate the secondary side control voltage Vcc_s. For example, for power delivery (PD) applications, the output voltage Vo is typically regulated from 5 V to 20 V. Therefore, a Buck converter or LDO voltage regulator may be used to generate the secondary side control voltage Vcc_s, which is the input to the non-regulated secondary side to primary side isolated DC-DC converter, which generates the primary side auxiliary voltage Vcc_p for the control circuit 330. Since the voltage Vcc_s is regulated, Vcc_p will also be regulated. In some applications wherein the output voltage Vo is fixed, the Buck converter or LDO regulator are not needed. In such cases, the output voltage Vo can be used directly as the input to the isolated DC-DC converter, i.e., Vcc_s=Vo.

As discussed above, the output voltage Vcc_p of the isolated DC_DC converter is not regulated. That is, the output voltage Vcc_p is determined by the input voltage Vcc_s and the transformer turns ratio. This significantly simplifies the implementation of the DC-DC converter. Thus, because (1) Vcc s is well regulated, (2) the control IC draws substantially constant current, and (3) the transformer turns ratio is fixed, the output voltage Vcc_p is maintained at a desired voltage without the need for a feedback control loop.

However, if tighter regulation is needed, or Vcc_s varies or fluctuates significantly, a closed loop regulated isolated DC-DC converter may be used to convert Vcc_s to a well-regulated Vcc_p, which powers the control IC.

Figure 3A:
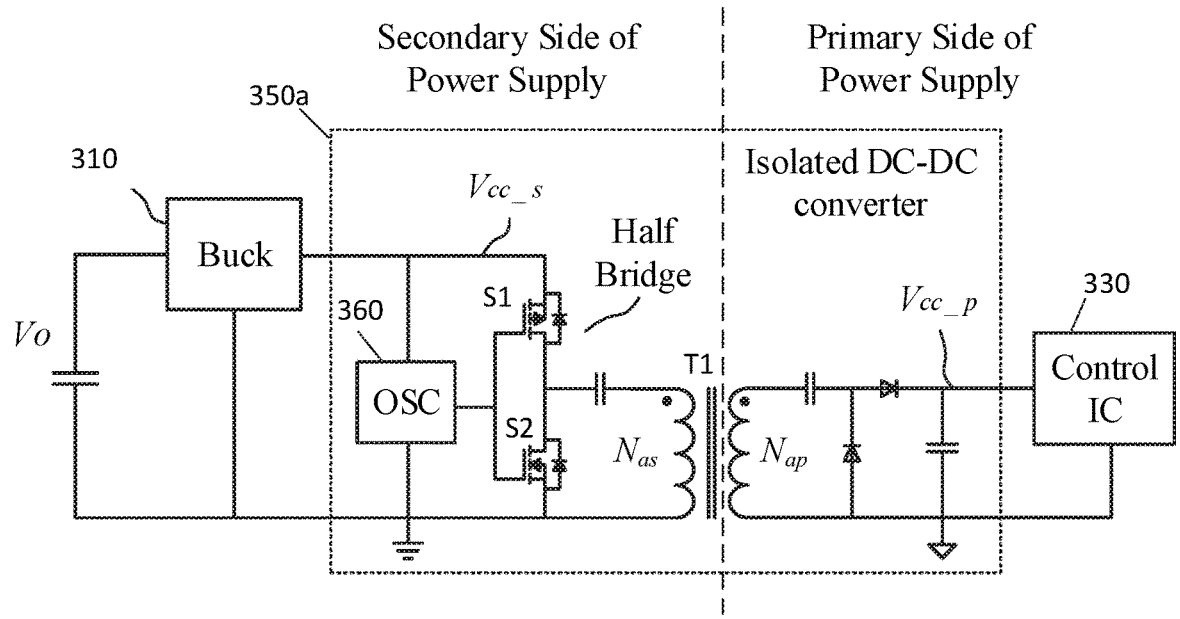
FIG. 3A is a circuit diagram of an isolated half-bridge DC-DC converter with single winding voltage doubler rectifier, according to one embodiment.
Figure 3B:
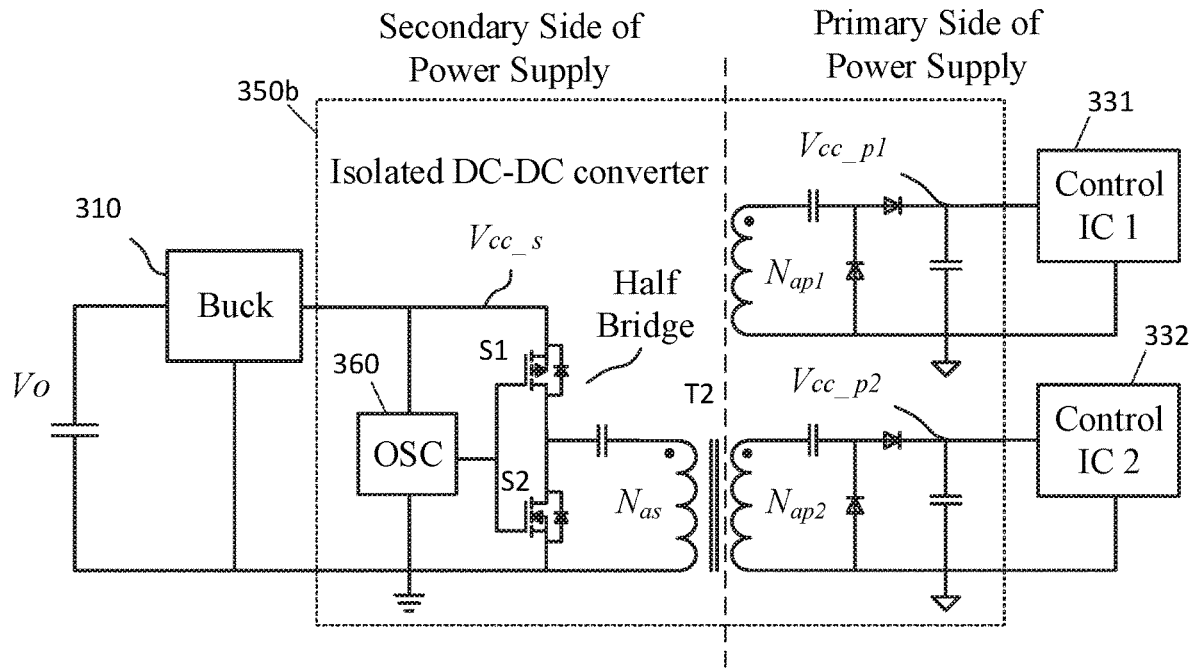
FIG. 3B is a circuit diagram of an isolated half-bridge DC-DC converter with double winding voltage doubler rectifier, according to one embodiment.

In the embodiment of FIG. 3A, the isolated DC-DC converter 350a is implemented with a half-bridge converter and single winding voltage doubler rectifier. An oscillator 360 provides driving signals to the half-bridge power amplifier switches S1, S2 to produce a high frequency AC square wave, which further drives the pulse transformer T1 in the next stage. The oscillator may be implemented by any of a number of ways known in the art, for example, by configuring an IC such as an op-amp or a 555 timer (e.g., LMC555, available from Texas Instruments Inc.). The frequency of the oscillator may be in the range of a few hundred kHz to MHz, depending on the size of the pulse transformer. The half bridge stage amplifies the square wave signal from the oscillator, which lacks driving capacity. A simple half bridge inverter may be implemented with, for example, a P channel MOSFET and an N channel MOSFET, or a PNP transistor and an NPN transistor, or two N channel MOSFETs with dedicated drivers. Alternatively, a MOSFET driver IC may be used with minimum peripheral components. Optionally, the oscillator and the power amplifier may be integrated into one IC.

The pulse transformer T1 along with peripheral components, i.e., diodes and capacitors, transfers the square wave AC voltage from the secondary side of the power supply to the primary side of the power supply and produces the DC voltage Vcc_p. The pulse transformer also provides electrical isolation between the primary and secondary sides of the power supply. The DC output voltage Vcc_p provides power for the controller IC 330 for primary side components of the AC-DC converter. As the Buck converter is regulated, the supply voltage is stable. The voltage Vcc_p can be set by adjusting the transformer turns ratio, i.e., Nas:Nap.

In some applications, two primary side auxiliary voltage levels are needed. This requirement can be satisfied with the embodiment of FIG. 3B. In this embodiment the isolated DC-DC converter 350b is implemented using a pulse transformer T2 with two windings on the primary side (Nap1 and Nap2) with properly designed turns ratios, together with peripheral components including diodes and capacitors, to produce the two output voltages Vcc_p1 and Vcc_p2 for corresponding control ICs 331 and 332. This embodiment is otherwise similar to the embodiment of FIG. 3A.

Figure 4:
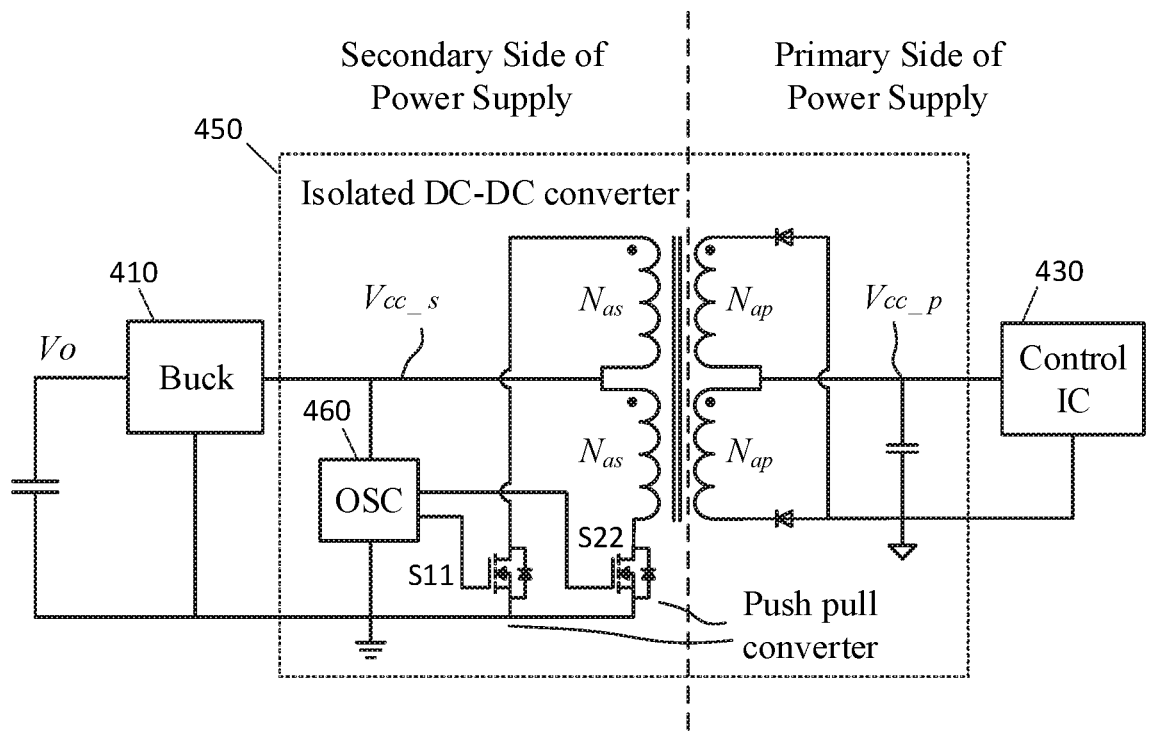
FIG. 4 is a circuit diagram of an isolated push-pull DC-DC converter with center-tapped transformer rectifier, according to one embodiment.

FIG. 4 shows another embodiment of an isolated DC-DC converter that may be used as the DC power circuit 250 (FIG. 2). The input voltage to the DC-DC converter is Vo, the output voltage of the AC-DC converter. As discussed above, a low power Buck converter 410 or a low-dropout (LDO) voltage regulator, etc., may optionally be used to provide the input voltage Vcc_s. This embodiment includes two switches S11, S22 in a push-pull converter configuration used to drive the primary windings Nas, Nas of a center-tapped pulse transformer T. The switches may be, for example, N-channel MOSFETs. An oscillator 460 is used to provide driving signals to the push-pull converter switches S11, S22. As in the above embodiments, the oscillator may be implemented any of a number of ways known in the art, for example, by configuring an IC such as an op-amp or a 555 timer. The frequency of the oscillator may be in the range of a few hundred kHz to MHz, depending on the size of the pulse transformer. The transformer center-tapped secondary windings are connected to rectifier diodes and a capacitor to produce the output voltage Vcc_p to power the control IC 430 of the AC-DC converter. In some embodiments, the oscillator and two-channel MOSFETs referenced to ground may be implemented in an IC.

It will be appreciated that further embodiments may be based on various combinations of half-bridge or push-pull converters (or other circuitry to converter DC to AC) on the secondary side of the DC-DC converter, and other rectifier types on the primary side. Non-limiting examples of such other embodiments are shown in FIGS. 5-9.

Figure 5:
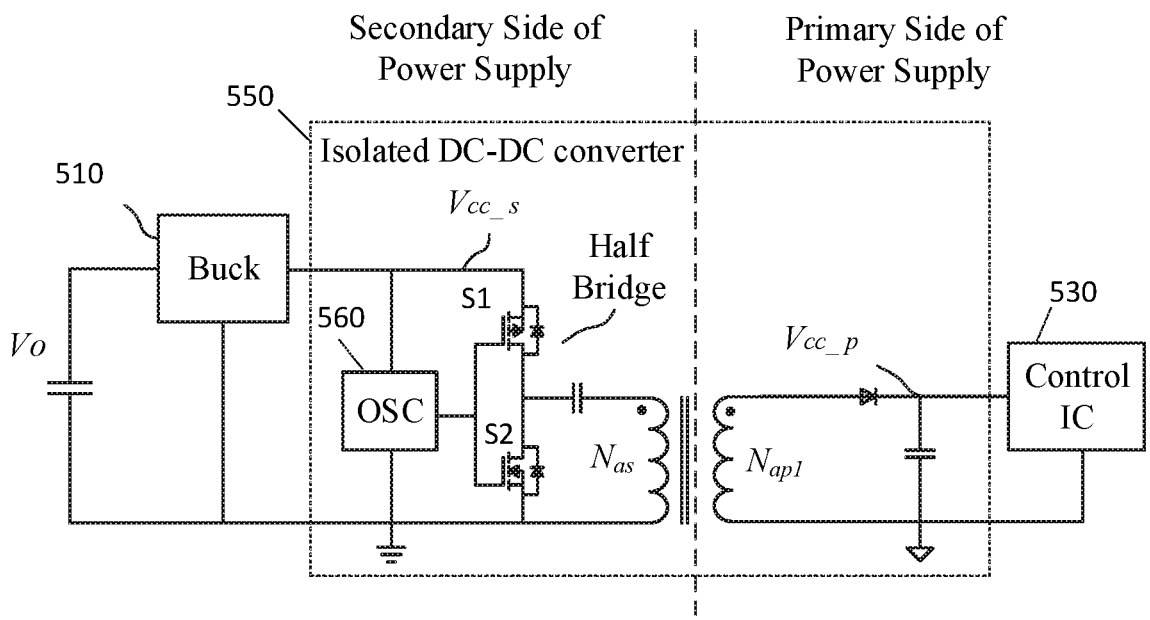
FIG. 5 is a circuit diagram of an isolated half-bridge DC-DC converter with single half wave rectifier, according to one embodiment.

FIG. 5 shows an embodiment of an isolated DC-DC converter 550 based on a half-bridge converter including an oscillator 560 and switches S1, S2, as in FIG. 3A, and a half wave rectifier that produces the output voltage Vcc_p for the control IC 530. As discussed above, a a low power Buck converter 510 or a low-dropout (LDO) voltage regulator, etc., may optionally be used to provide the input voltage Vcc_s.

Figure 6:
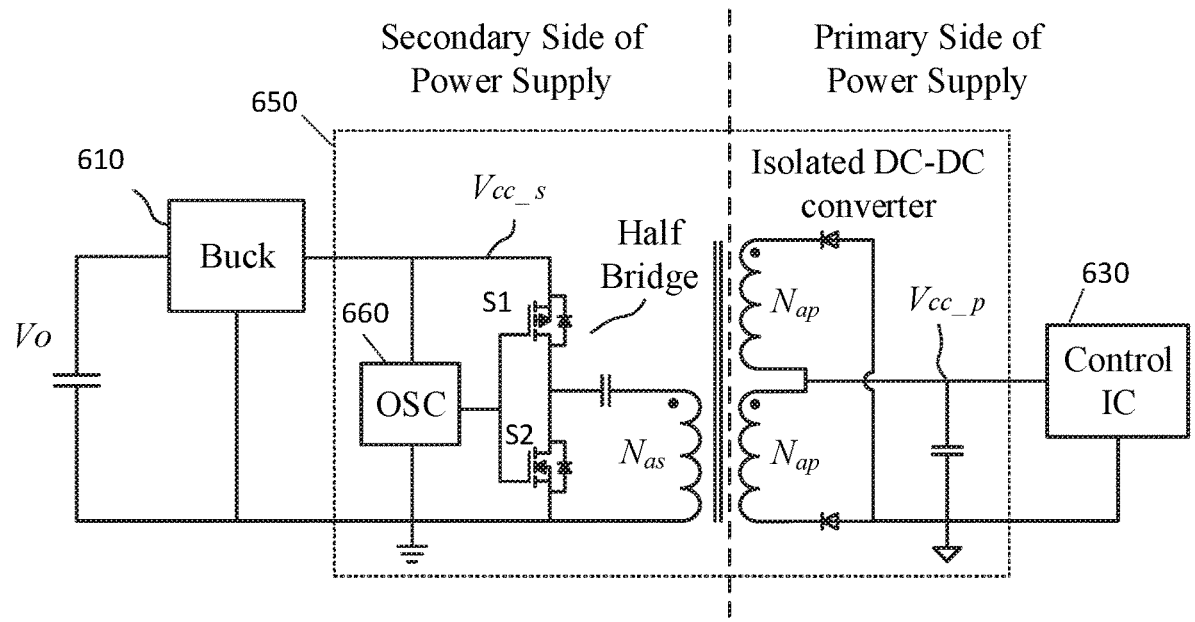
FIG. 6 is a circuit diagram of an isolated half-bridge DC-DC converter with center tapped rectifier, according to one embodiment.

FIG. 6 shows an embodiment of an isolated DC-DC converter 650 based on a half-bridge converter including an oscillator 660 and switches S1, S2, as in FIG. 3A, and a center tapped rectifier that produces the output voltage Vcc_p for the control IC 630. As discussed above, a low power Buck converter 610 or a low-dropout (LDO) voltage regulator, etc., may optionally be used to provide the input voltage Vcc_s.

Figure 7:
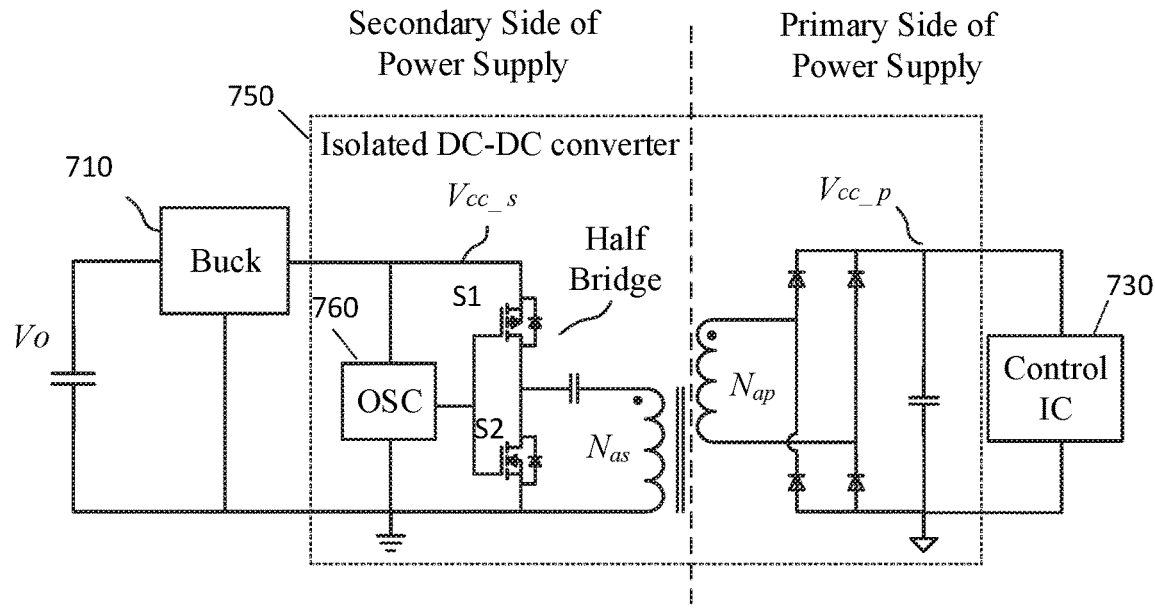
FIG. 7 is a circuit diagram of an isolated half-bridge DC-DC converter with full bridge rectifier, according to one embodiment.

FIG. 7 shows an embodiment of an isolated DC-DC converter 750 based on a half-bridge converter including an oscillator 760 and switches S1, S2, as in FIG. 3A, and a full bridge rectifier that produces the output voltage Vcc_p for the control IC 730. As discussed above, a low power Buck converter 710 or a low-dropout (LDO) voltage regulator, etc., may optionally be used to provide the input voltage Vcc_s.

Figure 8:
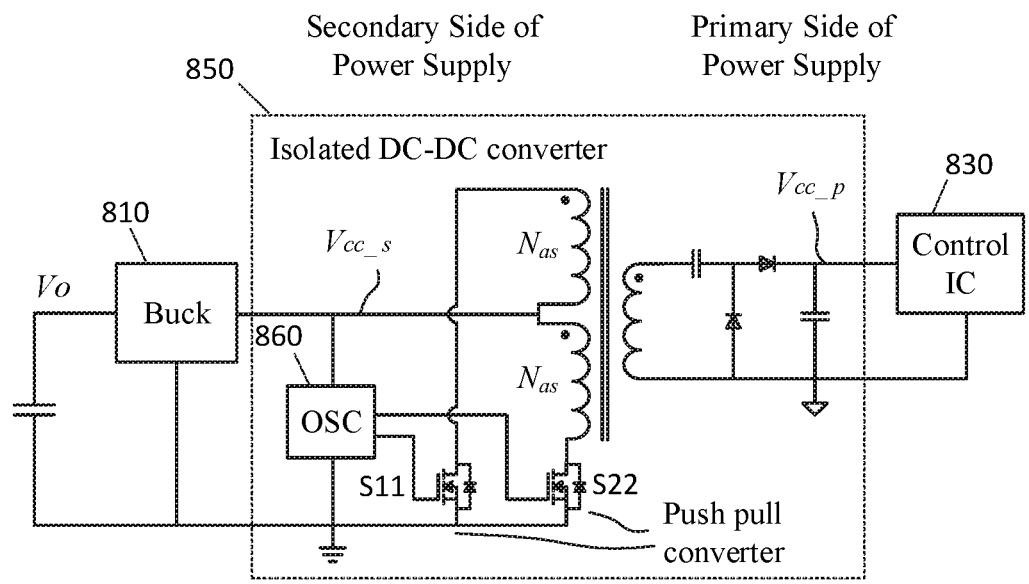
FIG. 8 is a circuit diagram of an isolated push-pull DC-DC converter with a single winding voltage doubler rectifier, according to one embodiment.

FIG. 8 shows an embodiment of an isolated DC-DC converter 850 based on a push-pull converter including an oscillator 860 and switches S11, S22, as in FIG. 4, and a single winding voltage doubler rectifier that produces the output voltage Vcc_p for the control IC 830. As discussed above, a low power Buck converter 810 or a low-dropout (LDO) voltage regulator, etc., may optionally be used to provide the input voltage Vcc_s.

Figure 9:
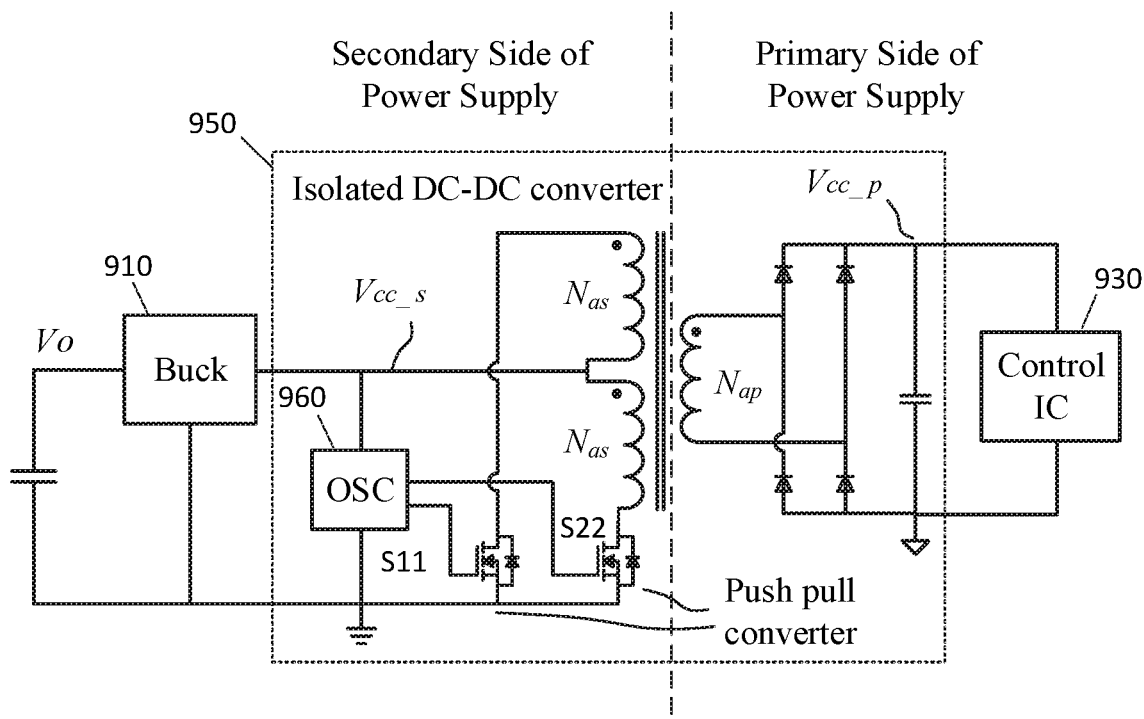
FIG. 9 is a circuit diagram of an isolated push-pull DC-DC converter with full bridge rectifier, according to one embodiment.

FIG. 9 shows an embodiment of an isolated DC-DC converter 950 based on a push-pull converter including an oscillator 960 and switches S11, S22, as in FIG. 4, and a full bridge rectifier that produces the output voltage Vcc_p for the control IC 930. As discussed above, a low power Buck converter 910 or a low-dropout (LDO) voltage regulator, etc., may optionally be used to provide the input voltage Vcc_s.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:
1. An AC-DC converter, comprising:
a primary side including an AC input and a primary side circuit having at least one switch;
an isolating transformer;
a secondary side including a secondary side circuit and a DC output;
a control circuit that provides control signals to the at least one switch of the primary side circuit; and
a DC power circuit having a secondary side that receives DC output power from the secondary side of the AC-DC converter, and a primary side that outputs DC power to the control circuit;
wherein the DC power circuit secondary side and primary side are isolated.
2. The AC-DC converter of claim 1, wherein the DC power circuit comprises an isolated DC-DC converter.
3. The AC-DC converter of claim 2, wherein the isolated DC-DC converter comprises a voltage regulator that regulates an output voltage Vcc_p of the isolated DC-DC converter.

4. The AC-DC converter of claim 3, comprising a circuit that regulates an input voltage Vcc_s of the isolated DC-DC converter.
5. The AC-DC converter of claim 4, wherein the circuit that regulates an input voltage Vcc_s of the isolated DC-DC converter is selected from a Buck converter and a low-dropout (LDO) voltage regulator.
6. The AC-DC converter of claim 2, wherein the isolated DC-DC converter comprises a pulse transformer that isolates a secondary side of the DC-DC converter from a primary side of the DC-DC converter.
7. The AC-DC converter of claim 6, wherein the isolated DC-DC converter comprises a secondary side half-bridge power amplifier that outputs pulses to the pulse transformer.
8. The AC-DC converter of claim 7, wherein the isolated DC-DC converter comprises an oscillator that provides driving signals to switches of the half-bridge power amplifier.
9. The AC-DC converter of claim 6, wherein the isolated DC-DC converter comprises a push-pull amplifier that outputs pulses to the pulse transformer.
10. The AC-DC converter of claim 9, wherein the isolated DC-DC converter comprises an oscillator that provides driving signals to switches of the push-pull amplifier.
11. The AC-DC converter of claim 2, wherein the isolated DC-DC converter primary side outputs first and second DC power to the control circuit.
12. A method for providing auxiliary power for a primary side control circuit of an AC-DC converter, comprising:
providing an AC-DC converter primary side including an AC input and a primary side control circuit having at least one switch, and an AC-DC converter secondary side including a secondary side circuit and a DC output;
implementing a DC power circuit having a secondary side that receives DC output power from the secondary side of the AC-DC converter, and a primary side that outputs DC auxiliary power to the primary side control circuit;
wherein the DC power circuit secondary side and primary side are isolated.
13. The method of claim 12, wherein the DC power circuit comprises an isolated DC-DC converter.
14. The method of claim 13, wherein the isolated DC-DC converter comprises a voltage regulator that regulates an output voltage Vcc_p of the isolated DC-DC converter.
15. The method of claim 13, comprising a circuit that regulates an input voltage Vcc_s of the isolated DC-DC converter.
16. The method of claim 15, wherein the circuit that regulates the input voltage Vcc_s of the isolated DC-DC converter is selected from a Buck converter and a low-dropout (LDO) voltage regulator.
17. The method of claim 13, wherein the isolated DC-DC converter comprises a pulse transformer that isolates a secondary side of the DC-DC converter from a primary side of the DC-DC converter.
18. The method of claim 17, wherein the isolated DC-DC converter comprises a secondary side half-bridge power amplifier that outputs pulses to the pulse transformer.
19. The method of claim 18, wherein the isolated DC-DC converter comprises an oscillator that provides driving signals to switches of the half-bridge power amplifier.
20. The method of claim 17, wherein the isolated DC-DC converter comprises a push-pull amplifier that outputs pulses to the pulse transformer.
21. The method of claim 20, wherein the isolated DC-DC converter comprises an oscillator that provides driving signals to switches of the push-pull amplifier.

22. The method of claim 21, wherein the isolated DC-DC converter primary side outputs first and second DC auxiliary power to the control circuit.

\* \* \* \* \*